United States Patent
Iijima et al.

(10) Patent No.: US 6,436,870 B1
(45) Date of Patent: Aug. 20, 2002

(54) HYDROTREATING CATALYST FOR HYDROTREATING HYDROCARBON OILS

(75) Inventors: Masahiko Iijima, Ohi-Machi; Takao Hashimoto, Higashimatuyama; Yoshinobu Okayasu, Ohi-Machi; Takeshi Isoda, Niiza, all of (JP)

(73) Assignee: Tonen Corporation, Saitama (JP)

( * ) Notice: Subject to any disclaimer, the term of this patent is extended or adjusted under 35 U.S.C. 154(b) by 0 days.

(21) Appl. No.: 09/652,954

(22) Filed: Aug. 31, 2000

(30) Foreign Application Priority Data

Oct. 7, 1999 (JP) .......................................... 11-287424

(51) Int. Cl.⁷ .......................... B01J 23/00; B01J 23/40; B01J 23/58; B01J 23/60; B01J 23/72
(52) U.S. Cl. ...................... 502/305; 502/307; 502/308; 502/309; 502/313; 502/314; 502/315; 502/318; 502/321; 502/322; 502/323; 502/327; 502/328; 502/329; 502/331; 502/333; 502/334; 502/335; 502/337; 502/339
(58) Field of Search ................................ 502/254, 255, 502/257, 258, 259, 260, 261, 262, 305, 306, 307, 308, 309, 313, 314, 315, 318, 321, 322, 323, 327, 328, 329, 331, 333, 334, 335, 337, 339

(56) References Cited

U.S. PATENT DOCUMENTS

| | | | |
|---|---|---|---|
| 4,020,011 A | * | 4/1977 | Nishikawa et al. ......... 252/441 |
| 4,020,012 A | * | 4/1977 | Miura et al. ................. 252/441 |
| 4,049,581 A | * | 9/1977 | Itoh et al. ............... 252/466 PT |
| 4,287,050 A | | 9/1981 | Eastman et al. ............. 208/215 |
| 4,460,698 A | * | 7/1984 | Hensley, Jr. et al. .......... 502/66 |
| 4,591,429 A | * | 5/1986 | Ho et al. ................. 208/254 H |
| 4,626,339 A | * | 12/1986 | Chianelli et al. ............. 208/18 |
| 4,760,045 A | * | 7/1988 | Oishi et al. ................. 502/321 |
| 4,792,541 A | * | 12/1988 | Ho et al. ..................... 502/167 |
| 4,801,570 A | * | 1/1989 | Young et al. ................ 502/220 |
| 5,152,885 A | | 10/1992 | Singhai et al. .............. 208/254 |
| 5,244,858 A | * | 9/1993 | Usui et al. .................. 502/220 |
| 6,267,874 B1 | * | 7/2001 | Iijima et al. ................ 208/217 |

FOREIGN PATENT DOCUMENTS

| | | | | |
|---|---|---|---|---|
| EP | 0177198 B1 | 8/1991 | ........... | C01B/13/14 |
| EP | 0448117 A1 | 9/1991 | ........... | C10G/45/08 |
| EP | 0512835 A1 | 11/1992 | ........... | B01J/23/89 |
| EP | 0748652 A1 | 12/1996 | ........... | B01J/21/04 |
| JP | 62241252 | 10/1987 | ........... | H01J/49/32 |
| JP | 03278840 | 12/1991 | ........... | H01J/23/85 |
| JP | 06226101 | 8/1994 | ........... | B01J/23/85 |

* cited by examiner

*Primary Examiner*—Steven P. Griffin
*Assistant Examiner*—Cam N. Nguyen
(74) *Attorney, Agent, or Firm*—James H. Takemoto

(57) ABSTRACT

A high-activity hydrotreating catalyst containing a uniformly dispersed active component at a high concentration, and particularly useful for deep desulfurization of a hydrocarbon oil for its high hydrodesulfurization activity. The present invention also provides a hydrotreating process using the same catalyst.

11 Claims, 2 Drawing Sheets

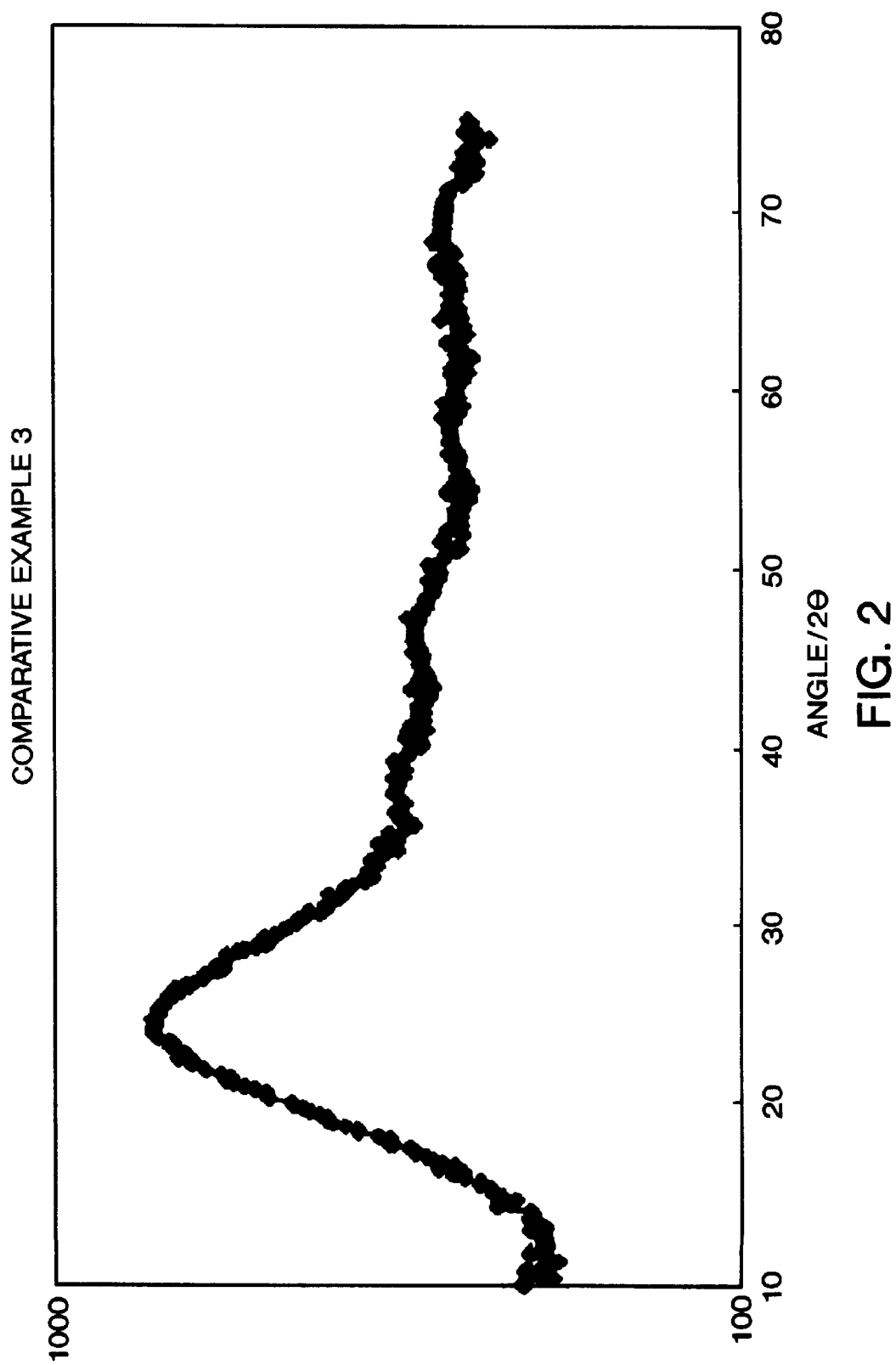

HYDROTREATING CATALYST FOR HYDROTREATING HYDROCARBON OILS

CROSS REFERENCE TO RELATED APPLICATIONS

This application claims priority to Japanese Patent Application No. 287424/1999, filed Oct. 7, 1999, which is incorporated herein by reference.

FIELD OF THE INVENTION

This invention relates to a catalyst for hydrotreating and a process for hydrotreating hydrocarbon oils using the same, more particularly to the multi-component solid catalyst with a hydrogenation-active component dispersed uniformly in a matrix of refractory, inorganic oxide, and the process for hydro-treating hydrocarbon oils using the same.

BACKGROUND OF THE INVENTION

Various types of catalysts have been proposed for hydrotreating hydrocarbon oils, e.g., those with one or more hydrogenation-active components carried by a refractory inorganic oxide (e.g., alumina, silica, magnesia and zirconia), and the hydrogenation-active component is selected from the group consisting of the group 6A elements (e.g., molybdenum, tungsten and chromium) and the group 8 elements (e.g., cobalt and nickel).

One of the widely used methods for producing these catalysts is impregnation, in which a carrier is impregnated with an aqueous solution of a group 6A element and group 8 element, dried and calcined. One of the disadvantages involved in the impregnation method is difficulty in dispersing the active component highly uniformly, because it is highly mobile during the catalyst production process from adsorption or precipitation to completion of drying. This mobility comes from the weak bond between the active component and carrier, because the carrier is impregnated, after it is prepared, with a solution of the active component, with the result that it is merely adsorbed or precipitated on the carrier.

Other disadvantages are limited content of the active component and difficulty in controlling the content in an optimum range. The active component is immobilized on the already prepared carrier, by which is meant that content of the active component tends to be limited by total pore volume of the carrier.

The conventional catalyst, therefore, tends to suffer lack of homogeneity and decreased number of active sites, when content of the active component is optimized to enhance catalyst hydrotreating activity. This tends to limit its activity. Therefore, new techniques for the catalysts of high homogeneity and activity have been increasingly in demand. As one of the attempts to realize such a catalyst, Japanese Laid-open Patent Application No. 83603/1986 discloses a method for producing a homogeneous, amorphous complex metal oxide. This method, however, involves several disadvantages. First, satisfying the amorphous condition tends to limit content of the hydrogenation-active component, and hence catalyst activity for hydrotreating. A carrier containing crystalline compound, e.g., —Al$_2$O$_3$, which has an effective function as the carrier for hydrotreating catalyst is no longer used for this method. An amorphous metal oxide is unstable and low in mechanical strength, and hence unsuitable for a commercial catalyst which is required to exhibit long serviceability.

Recently, reduction of sulfur content of gas oil is strongly required for environmental reasons, especially by deep desulfurization of stocks of high sulfur contents, e.g., light gas oil (LGO), vacuum gas oil (VGO) and cracked gas oil. In particular, sulfur content of diesel fuel oil is required to be reduced to 0.05 wt. % or lower. The techniques to achieve the required desulfurization level have been studied from wide angles, and it is now considered that whether this is achieved or not largely depends on whether sulfur compounds difficult to remove, e.g., 4-methyl dibenzothiophene and 4-6-dimethyl dibenzothiophene, are efficiently desulfurized. Development of catalysts of higher activity is essential also viewed from the above point.

It would be desirable to provide a high-activity hydrotreating catalyst, with a hydrogenation-active component highly dispersed, high in homogeneity and containing a crystalline component, which is also high in desulfurization activity for hydrotreating hydrocarbon oil, and also excellent in activity for, e.g., denitrogenation, dearomatization and cracking and which can treat diversified types of hydrocarbon oils, e.g., hydrodesulfurization, hydrodenitrogenation, hydrodearomatization, hydroisomerization, hydrocracking, hydrodewaxing, hydrodemetallization, in particular deep hydrodesulfurization of a diesel fuel fraction.

SUMMARY OF THE INVENTION

The inventors of the present invention have found, after having conducted extensive studies, that the catalyst comprising a refractory inorganic oxide matrix dispersed with a hydrogenation-active component, high in homogeneity and containing a crystalline component shows high activity for hydrotreating (e.g., hydrodesulftuizing) a hydrocarbon oil.

The present invention provides a hydrotreating catalyst containing a crystalline component comprising a refractory inorganic oxide matrix dispersed with a hydrogenation-active component,
said hydrogenation-active component comprising at least one active component (A) selected from group 6A elements, and/or at least one active component (B) selected from the group 8 elements, wherein (1) total content of said hydrogenation-active component is 0.02 moles to 0.4 moles per mole of all of the elements that constitute the catalyst, (2) of said hydrogenation-active component, any one, when present at 0.002 mol/mol or more, satisfies the following relationship (1), established by the electron probe microanalysis ("EPMA") line analysis:

$$N_{max} - N_{min} \leq 2 \times [3 \times (N_0)^{0.5} + 0.2 \times N_0] \quad (1)$$

($N_{max}$, $N_{min}$ and $N_0$ are the maximum, minimum and average contents of the hydrogenation-active component, determined by the EPMA line analysis), or following relationship (2), established by the EPMA plane analysis:

$$0.8 \leq S \text{ parameter} < 1, \ 0.8 \leq P \text{ parameter} < 1 \quad (2)$$

(S parameter and P parameter are an index for size uniformity and distribution of the active component particles, respectively, determined by the EPMA plane analysis), and (3) one or more diffraction lines relevant to crystalline component are observed by powder X-ray diffraction analysis.

The present invention also provides a process for hydrotreating a hydrocarbon oil, where the oil is brought into contact with hydrogen under hydrotreating conditions in the presence of the above hydrotreating catalyst.

BRIEF DESCRIPTION OF DRAWINGS

FIG. 2 is an X-ray diffraction pattern of the hydrotreating catalyst prepared by COMPARATIVE EXAMPLE 3.

DETAILED DESCRIPTION OF THE INVENTION

Figure 1:
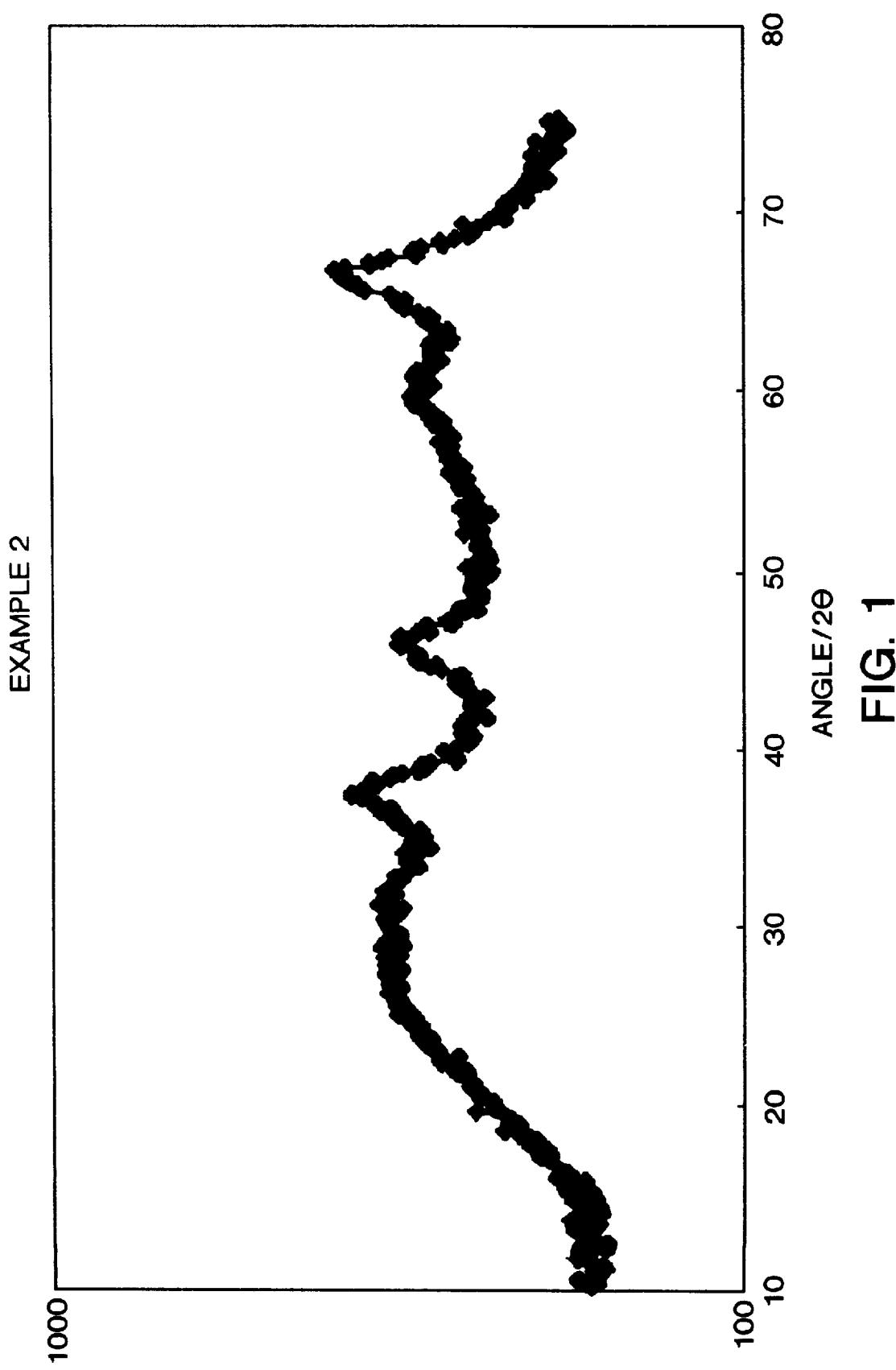
FIG. 1 is an X-ray diffraction pattern of the hydrotreating catalyst prepared by EXAMPLE 2.

The hydrotreating catalyst of the present invention comprises a refractory inorganic oxide matrix uniformly dispersed with a hydrogenation-active component, high in homogeneity and containing a crystalline component and satisfying the following conditions (1), (2) and (3):

(1) First, total content of said hydrogenation-active component is 0.02 moles to 0.4 moles per mole of all of the elements that constitute the catalyst. When two or more hydrogenation-active components are present, the total content is expressed as the sum content of the components.

(2) Secondly, of said hydrogenation-active component, any one, when present at 0.002 mol/mol or more, satisfies the following relationship (1), established by the EPMA line analysis:

$$N_{max} - N_{min} \leq 2 \times [3 \times (N_0)^{0.5} + 0.2 \times N_0] \quad (1)$$

or following relationship (2), established by the EPMA plane analysis:

$$0.8 \leq S \text{ parameter} < 1, \ 0.8 \leq P \text{ parameter} < 1 \quad (2)$$

The hydrotreating catalyst is able to exhibit high uniformity, when each of its active components satisfies the relationship (1) or (2), (3) Thirdly, one or more diffraction lines relevant to crystalline component are observed by powder X-ray diffraction analysis.

In the relationship (1), $N_{max}$, $N_{min}$ and $N_0$ are the maximum, minimum and average contents of the hydrogenation-active component in the variation range, determined by the EPMA line analysis.

The compounds useful for the refractory inorganic matrix as the constituent of the hydrotreating catalyst of the present invention include alumina, silica, magnesia, calcium oxide, boria, zirconia, titania, thoria, ceria, hafnia, phosphorus oxide, and various other metal oxides. In particular, oxide compositions having two or more oxides can be used. These include alumina-silica, alumina-magnesia, alumina-boria, alumina-zirconia, alumina-thoria, alumina-titania-zirconia, silica-magnesia, silica-zirconia, silica-boria, silica-thoria and silica-titania.

The preferable refractory inorganic oxide matrix for the present invention comprises alumina and silica, which may be incorporated with a third component, e.g., magnesia, boria, titania, zirconia, ceria, hafnia, thoria and phosphorus oxide. More concretely, these composites include alumina-silica-boria, alumina-silica-titania, alumina-silica-zirconia, alumina-silica-ceria, alumina-silica-magnesia, alumina-silica-halfnia, alumina-silica-phosphorus oxide and alumina-silica-boria-phosphorus oxide.

The above refractory inorganic oxide matrix of alumina, silica or alumina-silica may be incorporated with a zeolite or clay material, e.g., montmorillonite, kaolinite, halloysite, bentonite and attapulgite, to form the refractory inorganic oxide matrix component.

The hydrogenation-active component which constitutes the hydrotreating catalyst of the present invention is uniformly dispersed in the above refractory inorganic oxide matrix.

The hydrogenation-active component comprises at least one active component (A) selected from the group consisting of the group 6A elements, and/or at least one active component (B) selected from the group consisting of the group 8 elements. It may be further incorporated with an active component (C) selected from the group consisting of the group 1B, group 2B and group 7A elements.

The group 6A elements useful for the active component (A) include chromium, molybdenum and tungsten, of which molybdenum and tungsten are more preferable. Molybdenum is most preferable. They may be used either individually or in combination.

The elements useful for the active component (B) include iron, cobalt, nickel, ruthenium, rhodium, palladium, osmium, iridium and platinum, of which cobalt, nickel, ruthenium, rhodium, palladium, iridium and platinum are preferable. More preferable active components include cobalt, nickel and platinum. Cobalt and nickel are most preferable. They may be used either individually or in combination.

The elements useful for the active component (C), selected from the group 1B, group 2B and group 7A elements, include copper, zinc, manganese and rhenium. They may be used individually, but preferably in combination with the active components (A) and (B).

Total content of the active components (A), (B) and (C) for the hydrotreating catalyst of the present invention is 0.02 moles to 0.4 moles per mole of all of the elements that constitute the catalyst, preferably 0.024 mol/mol to 0.25 mol/mol. Reaction activity or the like of the catalyst will be insufficient at an active component content below 0.02 mol/mol. Securing the content within the above range realizes the catalyst high in homogeneity, containing a crystalline component and hence high in activity.

Next, homogeneity of the hydrotreating catalyst of the present invention is described.

"Homogeneity" of the hydrotreating catalyst of the present invention means that the refractory inorganic oxide matrix is uniformly dispersed with the active component particles of uniform size. More concretely, the following conditions are simultaneously satisfied:

(1) the particles of the hydrogenation-active component, comprising the active components (A), (B) and (C), to be dispersed in the refractory inorganic oxide matrix are uniformly sized, and (2) these particles are dispersed at constant intervals.

The catalyst will have high activity, when the active component particles are highly uniform in size and dispersed highly uniformly (i.e., at constant intervals), because it will have the active sites distributed widely and uniformly.

Homogeneity of the hydrotreating catalyst of the present invention is determined by electron probe microanalysis (referred to as "EPMA", as required). More concretely, EPMA line analysis or plane analysis is used, depending on size of the active component particles and distance between these particles, and the results are used to determine homogeneity.

EPMA line analysis determines concentration distribution of the active component of the group 6A element and/or group 8 element or the like in the catalyst section, trying to evaluate homogeneity based on the EPMA line analysis data obtained by numerically expressing variation range. The inventors of the present invention have found, after having analyzed a number of experimental results, that a catalyst is highly homogeneous and shows notable effects of hydrotreating, e.g., hydrodesulfurization, when it satisfies the following relationship:

The relationship (1) is expressed as follows:

$$N_{max}-N_{min}<2\times[3\times(N_0)^{0.5}+0.2\times N_0] \quad (1)$$

wherein $N_{max}$, $N_{min}$ and $N_0$ are the maximum, minimum and average contents of the hydrogenation-active component in the variation range of the catalyst section, determined by EPMA line analysis.

Any hydrogenation-active component is to be evaluated by the EPMA line analysis when it is present at 0.002 mol/mol or more in the catalyst. When two or more types of the hydrogenation-active components are present, each is to be evaluated, needless to say when one type of the hydrogenation-active component is present. The inventors of the present invention have found that activity of the catalyst is not greatly affected by its homogeneity, when the hydrogenation-active component is present at below 0.002 mol/mol. Therefore, activity of the catalyst for, e.g., desulfurization, can be sufficiently evaluated, when homogeneity of each hydrogenation-active component present at 0.002 mol/mol or more is measured. The hydrogenation-active component includes the above-described active components (A), (B) and (C). Each component should satisfy the relationship (1), when it is present at 0.002 mol/mol or more.

On the other hand, the EPMA plane analysis measures size and size distribution morphology of the active component particles, processing images to numerically express uniformity of the size and its distribution.

It is found by the plane analysis that a catalyst is highly homogeneous and shows notable effects of hydrodesulfurization, when it satisfies the following relationship:

The relationship (2) is expressed as follows:

$$0.8 \leq S \text{ parameter} < 1, \; 0.8 \leq P \text{ parameter} < 1 \quad (2)$$

wherein S parameter and P parameter are an index for size uniformity and distribution uniformity of the active component particles, respectively, each determined by processing the images obtained by the EPMA plane analysis.

S parameter is determined by processing the EPMA plane images using an image analysis free software NIH Image, and given by the following formula:

$$S = \sum_{i=1}^{n} si |nsi/\ln(1/n)$$

$$si = ai \Big/ \sum_{i=1}^{n} ai$$

wherein (n) is number of the active component particles, and (ai) is an area of the $i^{th}$ particle present in the plane.

P parameter is also determined by processing the EPMA plane images using an image analysis free software NIH Image, and given by the following formula:

$$P = \sum_{i=1}^{m} pi |npi/\ln(1/m)$$

$$pi = bi \Big/ \sum_{i=1}^{m} bi$$

wherein (m) is number of the divided sections of the same area, and (bi) is an area of the $i^{th}$ section.

Next, crystallinity of the hydrotreating catalyst of the present invention is described. The hydrotreating catalyst of the present invention contains a crystalline component, which represents another characteristic of the present invention together with its homogeneity. Its presence is judged when one or more diffraction lines are observed in the spectral pattern obtained by X-ray diffraction analysis (XRD). A concrete example is given in FIG. 1, which shows the XRD spectral pattern of the catalyst prepared by EXAMPLE 2. As shown, the sharp peaks relevant to the crystalline system are observed at specific diffraction angles. FIG. 2, on the other hand, gives the XRD spectral pattern of the catalyst prepared by COMPARATIVE EXAMPLE 3, showing no crystal-derived diffraction line, indicating that the catalyst is amorphous.

A catalyst, when containing a crystalline component, shows higher activity because of its capacity to contain a larger quantity of the active component. It will show still higher activity, when it contains a component having a crystalline compound such as $\alpha$-$Al_2O_3$ known to exhibit an effective function as a refractory inorganic oxide. Moreover, a crystalline component will secure a sufficient strength, and hence serviceability, for a commercial hydrotreating catalyst.

Next, the method for producing the hydrotreating catalyst of the present invention is described. The method for producing the catalyst is not limited, but the one suitable for the present invention is coprecipitation, which simultaneously precipitates two or more catalyst components from a mixture which contains at least one hydrogenation-active component.

More concretely, the process comprising the following steps can be used:

(1) oxygenated organometallic compounds as the starting materials for the refractory inorganic oxide matrix and inorganic metal salt as the starting material for the hydrogenation-active component are dissolved in a non-aqueous solvent, to prepare a homogeneous solution, (2) a precipitant-containing solution is added to the homogeneous solution prepared by the step (1), to prepare a gel slurry from the homogeneous sol, (3) the gel slurry prepared by the step (2) is aged, and (4) the aged gel is dried and calcined.

The compounds useful as the starting material for the refractory inorganic oxide matrix include alkoxides, acetylacetonates and carboxylates of aluminum, silicon, magnesium, calcium, boron, zirconium, titanium, thorium, cerium, hafnium and gallium, of which alkoxides with an alkoxyl group having a carbon number of 1 to 5 are preferable for their easiness of handling. These include aluminum methoxide, aluminum ethoxide, aluminum isopropoxide, aluminum butoxide, tetramethoxy silane, tetraethoxy silane, tetraisopropoxy silane, tetra-t-butoxy silane, magnesium methoxide, magnesium ethoxide, magnesium isopropoxide, calcium methoxide, boron methoxide, boron ethoxide, zirconium ethoxide, zirconium propoxide, zirconium-sec-butoxide, titanium ethoxide, titanium isopropoxide and hafnium ethoxide.

The compounds useful as the starting materials for the hydrogenation-active component include the inorganic metal salts described earlier. More concretely, they include nitrates, chlorides, oxychlorides and sulfides of molybdenum, tungsten, chromium, iron, cobalt, nickel, ruthenium, rhodium, palladium, osmium, iridium, platinum, copper, zinc, manganese and rhenium; and ammonium salts of the acids of the above metals. In addition to the above inorganic metal salts, organic metal salts, e.g., acetates, oxalates and alkoxides, may be also used.

The non-aqueous solvents useful for the present invention include monoalcohols, divalent alcohols, ketoalcohols, aminoalcohols and carboxylic acids. Quantity of the reaction material may be determined, depending on content of the desired catalytic component.

In the step (1), the homogeneous solution can be prepared by dissolving oxygenated organometallic compounds (e.g., aluminum alkoxide and silicon alkoxide) in a non-aqueous solvent with stirring, to which an inorganic metal salt (e.g., ammonium molybdate, or nitrate of cobalt or nickel) is added with stirring, to form the homogeneous solution. Aqueous solutions of ammonium molybdate, and nitrate of cobalt or nickel, or the like may be added in the subsequent step (2) to the homogeneous solution prepared in the step (1) by dissolving aluminum alkoxide and silicon alkoxide in a non-aqueous solvent with stirring. The hydrotreating catalyst of the present invention, high in homogeneity, containing a crystalline component and satisfying the relationship (1) or (2) described earlier can be produced by, in particular, controlling, e.g., temperature, pressure, stirring conditions, size of the gel particles, gel particle concentration, and quantity of hydrolyzing water in the precipitant solution, in the step (2) as the sol-preparation step.

In the step (1), the non-aqueous solvent is preferably used at 0.1 moles to 50 moles per mole of the total metallic and semi-metallic elements and phosphorus which constitute the hydrotreating catalyst, more preferably 1 mol/mol to 20 mol/mol. It is essential to avoid use of an excessive quantity of the solvent while controlling the reaction conditions in such a way to form the stable, fluid gel slurry, in order to prepare the catalyst of high homogeneity.

In the aging step (3), the gel slurry is held at 50° C. to 99° C. preferably for at least 1 hour. This aging step mainly controls pore characteristics of the catalyst, to enhance its reaction activity.

The aged gel slurry as the catalyst precursor is treated by filtration, settling, centrifugal separation or evaporation to adjust content of the water-containing solvent, and formed into a shape by tablet making, extrusion, rotary granulation or the like. The catalyst may be cylindrical, table-shaped, spherical or others, such as that having a four-leaf section. It is important for the catalyst to have a shape and size which allow to control packing density in the reactor. It is preferable to adjust size of the catalyst pellets, which is porous, for increasing packing density. Catalyst diameter is normally in a range from 0.5 mm to 20 mm on the average, viewed from increasing packing density and controlling pressure loss.

The catalyst pellets formed in the step (3) are then dried and calcined in the step (4). They may be dried by one of many methods, e.g., air-drying, drying in hot wind, drying under heating and freeze drying. They are calcined at 150° C. to 700° C. at which they are held for 1 hour to 20 hours in an oxidative, reducing, inert, sulfiding, nitriding, carbonizing or steam atmosphere depending on their specific purposes.

The hydrotreating catalyst of the present invention has a specific surface area of 10 $m^2/g$ to 1000 $m^2/g$ (preferably 200 $m^2/g$ to 800 $m^2/g$), total pore volume of 0.1 ml/g to 2 ml/g (preferably 0.2 ml/g to 1.5 ml/g) and average pore diameter of 4 Å to 1000 Å (preferably 10 Å to 600 Å), is high in homogeneity, contains a crystalline component, and is suitable as the catalyst for hydrotreating a hydro-carbon oil.

The present invention provides a hydrotreating catalyst, applicable to all types of the reactions proceeding in the presence of hydrogen, in particular hydrofinishing, hydrodesulfurization, hydrodenitrogenation, hydrodearomatization, hydroisomerization, hydrocracking, hydrodewaxing, hydrodemetallization and the like. The process of the present invention for hydrotreating a hydrocarbon oil is described as follows.

The hydrotreating process of the present invention includes all of the reactions, e.g., hydrofining, hydrodesulfurization, hydrodenitrogenation, hydrodearomatization, hydroisomerization, hydrocracking, hydrodewaxing, hydrodemetallization, occurring when hydrocarbon oils are brought into contact with hydrogen in the presence of the hydrotreating catalyst of the present invention under hydrotreating conditions. The hydrotreating conditions can be optionally selected for the desired reactions. The hydrotreating catalyst of the present invention is particularly suitable for the hydrodesulfurization of hydrocarbon oils.

Hydrocarbon oils which can be treated by the hydrotreating process of the present invention are not limited. They include petroleum-derived oils, e.g., atmospheric distillates, atmospheric residue, vacuum distillates, vacuum residue, cracked distillates, raffinates, hydrotreated oils, deasphalted oils, slack wax, Fischer-Tropsch wax and a mixture thereof. They also include oils derived from tar sand, shale oil, coal-liquefied oil, and a mixture thereof. The catalyst of the present invention is particularly suitable for treating vacuum, cracked and straight-run distillates to remove their sulfur- and nitrogen-containing compounds which are difficult to remove.

A vacuum distillate, produced by treating atmospheric residue under a vacuum, boils at around 370° C. to 610° C., and contains significant quantities of sulfur, nitrogen and metals, e.g., at 2.0 wt. % and 800 wt.ppm for sulfur and nitrogen. The sulfur-containing compounds include 4-methylbenzothiophene and 4,6-dimethyl-benzothiophene. The nitrogen-containing compounds include pyridines, amines and amides which are basic, and pyrroles which are weakly basic. The metals include nickel, vanadium and iron. The catalyst produced by the method of the present invention can treat these vacuum distillates most efficiently to remove sulfur and nitrogen.

Cracked distillates are the fractions boiling at around 200° C. or higher, produced by thermal cracking (e.g., coking or visbreaking) of residue, or light cycle gas oil (LCGO) or heavy cycle gas oil (HCGO) produced by a fluid catalytic cracking unit.

The atmospheric distillates which can be treated by the hydrotreating process of the present invention include straight-run naphtha, heavy naphtha and kerosene fractions. They also include gasoline components produced by various cracking units, e.g., catalytically cracked naphtha, thermally cracked naphtha and steam-cracked naphtha, and other light fractions used as fuel components which boil at around 250° C. or lower.

The hydrotreating conditions are not limited. They can be adequately selected for specific situations, e.g., type of hydrocarbon oil to be treated and desired reactions, and target desulfurization and denitrogenation levels. The preferable conditions are reaction temperature: 150° C. to 500° C., more preferably 200° C. to 450° C.; reaction pressure: 1 $kg/cm^2$ to 350 $kg/cm^2$, more preferably 5 $kg/cm^2$ to 300 $kg/cm^2$; hydrogen-containing treat gas rate: 30 l/l to 2000 l/l, more preferably 35 l/l to 1800 l/l; and liquid hourly space velocity: 0.01 V/H/V to 20.0 V/H/V, more preferably 0.05 V/H/V to 10.0 V/H/V. They are most preferably 250° C. to 400° C. as reaction temperature, 40 $kg/cm^2$ to 100 $kg/cm^2$ as reaction pressure, 180 l/l to 230 l/l as hydrogen-containing treat gas rate and 0.8 V/H/V to 1.5 V/H/V as liquid hourly space velocity. Hydrogen content in treat gas is normally in a range from 60% to 100%.

The hydrotreating catalyst of the present invention exhibits high activities for, e.g., desulfurization, denitrogenation and dearomatization and also high activity maintenance capacity therefor, and can achieve with stability required performance, e.g., desulfurization rate, for extended periods under the severe conditions which would deactivate the conventional catalyst in a short time, in particular under low reaction pressure.

Hydrotreatment of a hydrocarbon oil over the catalyst of the present invention can be effected in any type of reactor, e.g., fixed, fluidized, ebullated or moving bed type. A fixed bed type is a normal choice, for its simpler process and higher operability. Two or more reactors may be connected in series for deeper hydrotreatment. This is a particularly preferable configuration, when heavy oil is to be treated. Hydrocarbon oil may be brought into contact with a hydrogen-containing treat gas either co-currently or counter-currently.

EXAMPLES

The present invention is described more concretely by EXAMPLES, which by no means limit the present invention.

Homogeneity and crystallinity of the catalyst were analyzed by the following methods:

Homogeneity

Homogeneity of the catalyst was determined by an electron probe microanalyzer (EPMA, Shimadzu's EPM-810Q) under the following conditions:

Sample Preparation
  The catalyst sample embedded in a polyester resin was cut to produce a smooth section, which was coated with carbon black.
Measurement Conditions
  Acceleration voltage: 15 KV
  Sample current: 0.05 µA
  Beam size: 1 µm in diameter
  Measurement lines: Co-Kα, Mo-Kα, Ni-Kα, Zn-Kα, and Ru-Lα
EPMA line analysis: The catalyst was measured in the diametral direction at intervals of 1 µm steps.
EPMA plane analysis: Distribution of each element was analyzed in a square 200 by 140 µm.

Crystallinity
  X-ray diffraction (XRD) spectral pattern.
  The catalyst sample was analyzed by an X-ray diffractometer (Philips, goniometer, PW1820/00, high-voltage generator: PW1730/10, controller: PW1710/00, software: PW1877PC-APD ver. 3.6 g) under the following conditions:

| | |
|---|---|
| Tube anode | Cu |
| Generator tension | 40 kV |
| Generator current | 40 mA |
| Divergence slit | AUTOMATIC |
| Receiving slit | 0.2 |
| Sample spinner | ON |
| Monochrometer used | YES |
| Start angle | 20° |
| End angle | 75° |
| Step size | 0.02 |
| Time per step | 20 |

Example 1 (NCMSAH19)

A homogeneous solution of 130.1 g of aluminum isopropoxide [Al(i—OC$_3$H$_7$)$_3$] dissolved in 820.7 g of hexylene glycol was prepared with stirring at 80° C. for 4 hours, to which 13.9 g of tetraethoxysilane [Si(OC$_2$H$_5$)$_4$] was added with stirring at 80° C. for 3 hours.

Then, 11.2 g of 12-molybdo-1-phosphoric acid [H$_3$(PM$_{12}$O$_{40}$.6H$_2$O)] and 2.3 g of nickel nitrate [Ni(NO$_3$)$_2$.6H$_2$O)] were added to the above solution, with stirring at 80° C. for 17 hours, to prepare a homogeneous solution.

Pure water (98 ml) was added dropwise at 80° C. to the above homogeneous solution at 1 ml/min, to prepare a slurry containing the precipitate formed as a result of hydrolysis.

On completion of the agitation, the slurry was allowed to stand for 88 hours, while kept at 90° C., for aging. On completion of the aging, the slurry was evaporated and solidified by a rotary evaporator, and calcined at 650° C. in a flow of air, to prepare the catalyst NCMSAH19. Its chemical composition is given in Table 1.

The catalyst NCMSAH19 had a hydrogenation-active component at 0.051 mol/mol, and $N_{max}$: 812, $N_{min}$: 486 and $N_0$: 685 for the Mo component, $N_{max}$: 1370, $N_{min}$: 899 and $N_0$: 1147 for the Co component, and $N_{max}$: 366, $N_{min}$: 171 and $N_0$: 257 for the Ni component as the EPMA line analysis results. The $N_{max}$–$N_{min}$ (hereinafter referred to as [A]) and $2\times[3\times(N_0)^{0.5}+0.2\times N_0$ (hereinafter referred to as [B]) of the relationship (1) were calculated for each of the Mo, Co and Ni components. The results are given in Table 7. As shown, each of these components satisfied the relationship (1). It had a diffraction line at 2θ=65.4° in the XRD pattern.

Tables 7 and 8 gives properties and reaction activities of the catalysts prepared in EXAMPLES and COMPARATIVE EXAMPLES, respectively.

Example 2 (NCMSAH23)

A homogeneous solution of 116.4 g of aluminum isopropoxide [Al(i—OC$_3$H$_7$)$_3$] dissolved in 849.9 g of hexylene glycol was prepared with stirring at 80° C. for 4 hours, to which 12.4 g of tetraethoxysilane [Si(OC$_2$H$_5$)$_4$] was added with stirring at 80° C. for 3 hours.

Then, 14.0 g of 12-molybdo-1-phosphoric acid [H$_3$(PM$_{12}$O$_{40}$.6H$_2$O)], 14.0 g of cobalt nitrate [Co(NO$_3$)$_2$.6H$_2$O)] and 2.3 g of nickel nitrate [Ni(NO$_3$)$_2$.6H$_2$O)] were added to the above solution, with stirring at 80° C. for 17 hours, to prepare a homogeneous solution.

Pure water (175 ml) was added dropwise at 80° C. to the above homogeneous solution at 1 ml/min, to prepare a slurry containing the precipitate formed as a result of hydrolysis.

On completion of the agitation, the slurry was allowed to stand for 88 hours, while kept at 90° C., for aging. On completion of the aging, the slurry was treated to remove the supernatant liquid, evaporated and solidified by a rotary evaporator, and calcined at 650° C. in a flow of air, to prepare the catalyst NCMSAH23. Its chemical composition is given in Table 1.

The catalyst NCMSAH23 had a hydrogenation-active component at 0.069 mol/mol, and $N_{max}$: 1150, $N_{min}$: 630 and $N_0$: 925 for the Mo component, $N_{max}$: 2104, $N_{min}$: 1250 and $N_0$: 1627 for the Co component, and $N_{max}$: 378, $N_{min}$: 175 and $N_0$: 275 for the Ni component as the EPMA line analysis results. The terms [A] and [B] of the relationship (1) were calculated for each of the Mo, Co and Ni components, in a manner similar to that for EXAMPLE 1. The results are given in Table 7. As shown, each of these components satisfied the relationship (1). It had diffraction lines at 2θ=36.8, 45.5 and 66.2° in the XRD pattern.

Example 3 (NCMSAH19-1)

The same procedure as used for EXAMPLE 1 was repeated, except stirring time for preparing the homogeneous solution was extended from 17 hours to 25 hours, to prepare the catalyst NCMSAH19-1. The measured content of the hydrogenation-active component, homogeneity and crystallinity are given in Tables 1 and 2.

Example 4 (CMPDSAH02)

A homogeneous solution of 116.9 g of aluminum isopropoxide [Al(i—OC$_3$H$_7$)$_3$] dissolved in 782.0 g of hexylene glycol was prepared with stirring at 80° C. for 4 hours, to which 12.5 g of tetraethoxysilane [Si(OC$_2$HS)$_4$] was added with stirring at 80° C. for 3 hours.

Then, 14.0 g of 12-molybdo-1-phosphoric acid [H$_3$(PM$_{12}$O$_{40}$.6H$_2$O)] and 15.5 g of cobalt nitrate [Co(NO$_3$)$_2$.6H$_2$O)] were added to the above solution, with stirring at 80° C. for 17 hours, to prepare a homogeneous solution.

An aqueous solution of 0.4 g of palladium nitrate [Pd(NO$_3$)$_2$] dissolved in 176 ml of pure water was added dropwise at 80° C. to the above homogeneous solution at 1 ml/min, to prepare a slurry containing the precipitate formed as a result of hydrolysis.

On completion of the agitation, the slurry was allowed to stand for 88 hours, while kept at 90° C., for aging. On completion of the aging, the slurry was treated to remove the supernatant liquid, evaporated and solidified by a rotary evaporator, and calcined at 650° C. in a flow of air, to prepare the catalyst CMPDSAH02.

The catalyst CMPDSAH02 had a hydrogenation-active component at 0.068 mol/mol, and N$_{max}$: 1209, N$_{min}$: 664 and N$_0$: 993 for the Mo component, N$_{max}$: 2232, N$_{min}$: 1382 and N$_0$: 1713 for the Co component, and N$_{max}$: 0, N$_{min}$: 0 and N$_0$: 0 for the Pd component as the EPMA line analysis results. The calculated terms [A] and [B] of the relationship (1) are given in Table 7. It had diffraction lines at 2θ=33.9 and 65.9° in the XRD pattern.

Example 5 (NMPt/20862R1)

A homogeneous solution of 136.1 g of aluminum isopropoxide [Al(i—OC$_3$H$_7$)$_3$] dissolved in 870.0 g of hexylene glycol was prepared with stirring at 80° C. for 4 hours, to which 29.4 g of tetraethoxysilane [Si(OC$_2$H$_5$)$_4$] was added with stirring at 80° C. for 3 hours.

Then, 5.8 g of nickel nitrate [Ni(NO$_3$)$_2$.6H$_2$O)] and 0.13 g of chloroplatinic acid [H$_2$PtCl$_6$.6H$_2$O)] were added to the above solution, with stirring at 80° C. for 17 hours, to prepare a homogeneous solution.

An aqueous solution of 7.4 g of ammonium 7-molybdate [(NH$_4$)$_6$Mo$_7$O$_{24}$.4H$_2$O)] dissolved in 231 ml of pure water was added dropwise at 80° C. to the above homogeneous solution at 1 ml/min, to prepare a slurry containing the precipitate formed as a result of hydrolysis.

On completion of the agitation, the slurry was allowed to stand for 88 hours, while kept at 90° C., for aging. On completion of the aging, the slurry was treated to remove the supernatant liquid, evaporated and solidified by a rotary evaporator, and calcined at 650° C. in a flow of air, to prepare the catalyst NMPt/20862R1.

The catalyst NMPt/20862R1 had a hydrogenation-active component at 0.027 mol/mol, and N$_{max}$: 544, N$_{min}$: 269 and N$_0$: 417 for the Mo component, N$_{max}$: 745, N$_{min}$: 402 and N$_0$: 575 for the Co component, and N$_{max}$: 0, N$_{min}$: 0 and N$_0$: 0 for the Pt component as the EPMA line analysis results. The calculated terms [A] and [B] of the relationship (1) are given in Table 7. It had a diffraction line at 2θ=65.5° in the XRD pattern.

Example 6 (NMZ/50SAH13R3)

A homogeneous solution of 84.1 g of aluminum isopropoxide [Al(i—OC$_3$H$_7$)$_3$] dissolved in 829.6 g of hexylene glycol was prepared with stirring at 80° C. for 4 hours, to which 72.8 g of tetraethoxysilane [Si(OC$_2$H$_5$)$_4$] was added with stirring at 80° C. for 3 hours.

Then, 5.8 g of nickel nitrate [Ni(NO$_3$)$_2$.6H$_2$O)] and 1.8 g of zinc nitrate [Zn(NO$_3$)$_2$.6H$_2$O)] were added to the above solution, with stirring at 80° C. for 17 hours, to prepare a homogeneous solution.

An aqueous solution of 7.4 g of ammonium 7-molybdate [(NH$_4$)$_6$Mo$_7$O$_{24}$.4H$_2$O)] dissolved in 237 ml of pure water was added dropwise at 80° C. to the above homogeneous solution at 1 ml/min, to prepare a slurry containing the precipitate formed as a result of hydrolysis.

On completion of the agitation, the slurry was allowed to stand for 88 hours, while kept at 90° C., for aging. On completion of the aging, the slurry was treated to remove the supernatant liquid, evaporated and solidified by a rotary evaporator, and calcined at 650° C. in a flow of air, to prepare the catalyst NMZ/50SAH13R3.

The catalyst NMZ/50SAH13R3 F had a hydrogenation-active component at 0.027 mol/mol, and N$_{max}$: 471, N$_{min}$: 235 and N$_0$: 352 for the Mo component, N$_{max}$: 833, N$_{min}$: 437 and N$_0$: 626 for the Ni component, and N$_{max}$: 654, N$_{min}$: 328 and N$_0$: 492 for the Zn component as the EPMA line analysis results. The calculated terms [A] and [B] of the relationship (1) are given in Table 7. It had a diffraction line at 2=65.4° in the XRD pattern.

Example 7 (NM/ZSAH03)

A homogeneous solution of 75.1 g of aluminum isopropoxide [Al(i—OC$_3$H$_7$)$_3$] dissolved in 687.1 g of hexylene glycol was prepared with stirring at 80° C. for 4 hours, to which 29.9 g of zirconium isopropoxide [Zr(i—OC$_3$H$_7$)$_4$] and 26.0 g of tetraethoxysilane [Si(OC$_2$H$_5$)$_4$] were added with stirring at 80° C. for 3 hours.

Then, 9.7 g of nickel niytrate [Ni(NO$_3$)$_2$.6H$_2$O)] was added to the above solution, with stirring at 80° C. for 17 hours, to prepare a homogeneous solution.

Then, an aqueous solution of 12.3 g of ammonium 7-molybdate [(NH$_4$)$_6$Mo$_7$O$_{24}$.4H$_2$O)] dissolved in 177 ml of pure water was added dropwise at 80° C. to the above homogeneous solution at 1 ml/min, to prepare a slurry containing the precipitate formed as a result of hydrolysis.

On completion of the agitation, the slurry was allowed to stand for 88 hours, while kept at 90° C., for aging. On completion of the aging, the slurry was treated to remove the supernatant liquid, evaporated and solidified by a rotary evaporator, and calcined at 650° C. in a flow of air, to prepare the catalyst NM/ZSAH03.

The catalyst NM/ZSAH03 had a hydrogenation-active component at 0.054 mol/mol, and N$_{max}$: 855, N$_{min}$: 512 and N$_0$: 722 for the Mo component, and N$_{max}$: 1178, N$_{min}$: 666 and N$_0$: 910 for the Ni component as the EPMA line analysis results. The calculated terms [A] and [B] of the relationship (1) are given in Table 7. It had a diffraction line at 2θ=65.3° in the XRD pattern.

Comparative Example 1

Pure water (2.0 L) was heated to about 70° C., to which caustic soda was added to prepare alkaline water of pH around 12. An aqueous solution of aluminum sulfate (aluminum sulfate: 518 g and pure water: 710 g) was added to the above alkaline water. The solution was adjusted at pH 8.4 to 8.8 with caustic soda or nitric acid, and aged at around 70° C. for around 0.5 hours, to form an aqueous solution containing the precipitate (gel) of aluminum hydrate. An aqueous solution of sodium silicate (No. 3 water glass, pure water: 210 g) was added to the above aqueous solution. The mixed solution was adjusted at pH 8.8 to 9.2 with nitric acid, and aged at around 70° C. for around 0.5 hours, to form a slurry solution containing precipitated particles of alumina hydrate covered with silica hydrate. This slurry was filtrated, and the separated cake was washed with an aqueous solution of ammonium carbonate, until sodium content in the filtrate was decreased to 5 ppm or less. The cake was dried at 80° C. in a kneader to a moisture content at which it was moldable, and extruded into cylindrical pellets, 1.5 mm in diameter. The pellets were dried at 120° C. for 16 hours and calcined at 700° C. for 3 hours, to prepare the carrier.

The carrier was impregnated with an aqueous solution of ammonium 7-molybdate, and dried at 120° C. and calcined at 450° C. It was then impregnated with an aqueous solution of cobalt nitrate and nickel nitrate, and dried at 120° C. and calcined at 500° C., to prepare the comparative catalyst (a).

The comparative catalyst (a) had a hydrogenation-active component at 0.051 mol/mol, and $N_{max}$: 1531, $N_{min}$: 723 and $N_0$: 1179 for the Mo component, $N_{max}$: 1289, $N_{min}$: 702 and $N_0$: 1019 for the Co component, and $N_{max}$: 349, $N_{min}$: 128 and $N_0$: 258 for the Ni component as the EPMA line analysis results. This catalyst failed to satisfy the relationship (1), as shown in Table 8. It had diffraction lines at $2\theta=46.0$ and 66.00 in the XRD pattern.

Comparative Example 2

A mixture of 178.3 g of aluminum isopropoxide [Al(i—$OC_3H_7)_3$] and 765 ml of 2-methylpentane-2,4-diol [$CH_3CH(OH)CH_2C(CH_3)_2OH$] was stirred to react them with each other at 80° C. for 4 hours, to which 13.9 g of tetraethoxysilane [$Si(OC_2H_5)_4$] was added with stirring at 80° C. for 20 hours, for further reactions. Water (196 ml) was added to the above reaction system at 1 ml/min, for hydrolysis at 80° C.

The effluent solution was aged at 90° C. for 72 hours, evaporated and solidified by a rotary evaporator, and calcined at 650° C. for 5 hours in a flow of air. The green compact thus prepared was molded by a tablet maker, 20 mm in diameter, at 2 tons/cm$^2$, into a carrier of 11% $SiO_2$—$Al_2O_3$.

The carrier was impregnated with active metals by the following procedure: The impregnation solution was prepared by dissolving 11.2 g of 12-molybdo-1-phosphoric acid [$H_3(PM_{12}O_{40}.6H_2O)$], 9.7 g of cobalt nitrate [$Co(NO_3)_2.6H_2O$], 2.3 g of nickel nitrate [$Ni(NO_3)_2.6H_2O$] and 5.8 g of citric acid in 44 g of a mixed solution of ammonia water and pure water, where ammonia water/pure water ratio was adjusted to make the solution with the solutes completely dissolved at pH 9.

The carrier was mixed with the impregnation solution by adding the latter dropwise onto the former. The impregnated carrier was dried at 110° C. all night, and calcined at 500° C. for 3 hours in a flow of air, to prepare the comparative catalyst (b).

The comparative catalyst (b) thus prepared had a composition of silica: 8.0 wt. %, alumina: 65.0 wt. %, molybdenum oxide: 20.0 wt. %, cobalt oxide: 5.0 wt. %, nickel oxide: 1.2 wt. % and phosphorus oxide: 0.8 wt. %, and properties of specific surface area: 244 m$^2$/g and total pore volume: 0.43 ml/g.

The comparative catalyst (b) had a hydrogenation-active component at 0.051 mol/mol, and $N_{max}$: 1392, $N_{min}$: 759 and $N_0$: 1072 for the Mo component, $N_{max}$: 1228, $N_{min}$: 737 and $N_0$: 926 for the Co component, and $N_{max}$: 367, $N_{min}$: 155 and $N_0$: 245 for the Ni component as the EPMA line analysis results. This catalyst failed to satisfy the relationship (1), as shown in Table 8. It had a diffraction line at $2\theta=65.5°$ in the XRD pattern.

Comparative Example 3

3 g of ruthenium trichloride was dissolved in 80 g of ethylene glycol, put in a 300 ml beaker, to which 91.0 g of tetraethoxysilane and 23.6 g of triethyl borate were added, and the mixture was heated at 70° C. for 3 hours, with stirring. Next, 12 g of water was added to the above solution, and kept at the same temperature for 1 hour with stirring, to which another 12 g of water was added. When stirred at the same temperature, the solution was solidified like agar. It was allowed to stand at 25° C. all night, crushed into pieces of adequate size, transferred to a 300 ml eggplant-shaped flask, and dried at 100° C. for 24 hours under a vacuum using an evaporator. The dried gel was finely crushed, and thermally treated at 400° C. for 8 hours in a flow of hydrogen, to prepare the comparative catalyst (c). The comparative catalyst (c) had $N_{max}$: 193, $N_{min}$: 82 and $N_0$: 121 for the Ru component as the EPMA line analysis results, which satisfied the relationship (1). However, it showed no diffraction line in the XRD pattern (FIG. 2). It had a hydrogenation-active component at 0.007 mol/mol.

TABLE 1

| | EXAMPLES | | | | | | | COMPARATIVE EXAMPLES | | |
|---|---|---|---|---|---|---|---|---|---|---|
| | 1 | 2 | 3 | 4 | 5 | 6 | 7 | 1 | 2 | 3 |
| Catalysts | NCMSAH19 | NCMSAH23 | NCMSAH19-1 | CMPDSAH02/20862R1 | NMPt/50SAH13R3 | NMZ/ZSAH03 | NM | a | b | c |
| Chemical Composition (wt. %) | | | | | | | | | | |
| $MoO_3$ | 20.0 | 25.0 | 20.0 | 25.0 | 12.0 | 12.0 | 20.0 | 20.0 | 20.0 | — |
| CoO | 5.0 | 7.5 | 5.0 | 8.0 | — | — | — | 5.0 | 5.0 | — |
| NiO | 1.2 | 1.2 | 1.2 | — | 3.0 | 3.0 | 5.0 | 1.2 | 1.2 | — |
| Pt | — | — | — | — | 0.1 | — | — | — | — | — |
| Pd | — | — | — | 0.4 | — | — | — | — | — | — |
| Ru | — | — | — | — | — | — | — | — | — | 3.8 |
| ZnO | — | — | — | — | — | 1.0 | — | — | — | — |
| $Al_2O_3$ | 65.0 | 58.1 | 65.0 | 58.4 | 67.9 | 42.0 | 37.5 | 65.0 | 65.0 | — |
| $SiO_2$ | 8.0 | 7.2 | 8.0 | 7.2 | 17.0 | 42.0 | 15.0 | 8.8 | 8.0 | 84.7 |
| $ZrO_2$ | — | — | — | — | — | — | 22.5 | — | — | — |
| $B_2O_3$ | — | — | — | — | — | — | — | — | — | 11.5 |
| $P_2O_5$ | 0.8 | 1.0 | 0.8 | 1.0 | — | — | — | — | 0.8 | — |
| Hydrogenation-Active Component, | 0.051 | 0.069 | 0.051 | 0.068 | 0.027 | 0.030 | 0.054 | 0.051 | 0.047 | 0.007 |

TABLE 1-continued

|  | EXAMPLES | | | | | | | COMPARATIVE EXAMPLES | | |
|---|---|---|---|---|---|---|---|---|---|---|
|  |  |  |  | 4 | 5 | 6 |  | 1 | 2 | 3 |
| Catalysts | 1 NCMSAH19 | 2 NCMSAH23 | 3 NCMSAH19-1 | CMPDSAH02 /20862R1 | NMPt /50SAH13R3 | NMZ /ZSAH03 | 7 NM | a | b | c |
| Total Content on the Total Mols (mol/mol) |  |  |  |  |  |  |  |  |  |  |
| Specific Surface Area (m$^2$/g) | 434 | 307 | 420 | 336 | 300 | 212 | 240 | 262 | 244 | 399 |
| Total Pore Volume (ml/g) | 0.94 | 1.02 | 0.90 | 0.99 | 0.56 | 0.34 | 0.43 | 0.42 | 0.43 | 0.10 |

TABLE 2

|  | EXAMPLES | | | | | | | COMPARATIVE EXAMPLES | | |
|---|---|---|---|---|---|---|---|---|---|---|
|  |  |  |  | 4 | 5 | 6 |  | 1 | 2 | 3 |
| Catalysts | 1 NCMSAH19 | 2 NCMSAH23 | 3 NCMSAH19-1 | CMPDSAH02 /20862R1 | NMPt /50SAH13R3 | NMZ /ZSAH03 | 7 NM | a | b | c |
| Homogeneity EPMA line analysis results Mo Component |  |  |  |  |  |  |  |  |  |  |
| N$_{max}$ | 812 | 1150 | 893 | 1209 | 544 | 471 | 855 | 1531 | 1392 | — |
| N$_{min}$ | 486 | 630 | 535 | 664 | 269 | 235 | 521 | 723 | 759 | — |
| No | 685 | 925 | 754 | 993 | 417 | 352 | 722 | 1179 | 1072 | — |
| Co Component |  |  |  |  |  |  |  |  |  |  |
| N$_{max}$ | 1370 | 2104 | 1507 | 2232 | — | — | — | 1289 | 1228 | — |
| N$_{min}$ | 899 | 1250 | 989 | 1382 | — | — | — | 702 | 737 | — |
| No | 1147 | 1627 | 1262 | 1713 | — | — | — | 1019 | 926 | — |
| Ni Component |  |  |  |  |  |  |  |  |  |  |
| N$_{max}$ | 366 | 378 | 384 | — | 745 | 833 | 1178 | 349 | 367 | — |
| N$_{min}$ | 171 | 175 | 180 | — | 402 | 437 | 666 | 128 | 155 | — |
| No | 257 | 275 | 270 | — | 575 | 626 | 910 | 258 | 245 | — |
| Other Hydrogenation-active Components |  |  |  | Pd | Pt | Zn |  |  |  | Ru |
| N$_{max}$ |  |  |  | 0 | 0 | 654 |  |  |  | 193 |
| N$_{min}$ |  |  |  | 0 | 0 | 328 |  |  |  | 82 |
| No |  |  |  | 0 | 0 | 492 |  |  |  | 121 |
| Crystallinity: Diffraction Line | Observed | Observed | Observed | Observed | Observed | Observed | Observed | Observed | Observed | Not Observed |

Evaluation of Catalyst Activity

The catalysts prepared by EXAMPLES and COMPARATIVE EXAMPLES were evaluated for their activity by hydrotreating a hydrocarbon oil under the following conditions. The results of evaluation of the catalyst activities are given in Table 6.

(1) Evaluation of hydrodesulfurization (HDS) activity with light gas oil (LGO-D) from a Middle Eastern crude:

Test oil properties, reactor system and reaction conditions are given in Table 3.

The test was conducted by the following procedure:
The catalyst (4.6 g) packed in a reactor was treated with a hydrogen gas containing 5% of H$_2$S flown at 200 cc/min, for sulfiding under the following temperature program:
The catalyst was heated from room temperature to 200° C. in 30 min, at which it was held for 30 min, to 340° C. in 30 min, at which it was held for 2 hours, and then cooled to 200° C. in 30 min.
LGO-D (approximately 25 cc) was introduced into the reactor when the sulfided catalyst was cooled to 170° C.

After LGO-D went through the catalyst bed, reactor pressure was increased, and then temperature was also increased to 320° C. in 30 min, for the HDS reactions. Catalyst HDS activity was determined by measuring sulfur content of the product obtained 10 hours after LGO-D was charged.

HDS activity was determined by the following formula:

HDS activity=(Liquid Hourly Space Velocity per Unit Catalyst Weight)×[1/S$^{0.5}$−1/S$_0^{0.5}$]

wherein, S and S$_0$ are sulfur contents of the product and feed.

(2) Evaluation of hydrodesulfurization (HDS), hydrodenitrogenation (HDN), hydrodearomatization (HDA), hydroisomerization (HI), and hydrocracking (HC) activities with a model feed.

The evaluation test conditions are given in Table 4.

The evaluation test was conducted using a 50 ml flow type autoclave by the following procedure:

The catalyst (0.5 g) put in the autoclave reactor was treated with a hydrogen gas containing 5% of $H_2S$ flown at 200 cc/min, for sulfidation under the following temperature program:

The catalyst was heated from room temperature to 200° C. in 30 min, at which it was held for 30 min, to 340° C. in 30 min, at which it was held for 2 hours, and then cooled to 200° C. in 30 min.

A test oil for each test was passed into the reactor when the sulfided catalyst was cooled to 200° C. On completion of passing the test oil, reactor pressure was increased to 9 kg/cm²-G, and then temperature was also increased to 310° C. in 30 min, for the hydrotreating reactions under the conditions given in Table 4.

Hydrodesulfurization(HDS), hydrodenitrogenation (HDN), hydrodearomatization (HDA), hydroisomerization (HI), and hydrocracking(HC) activities were determined by the following formulae:

HDS activity (DBT)=(Liquid Hourly Space Velocity per Unit Catalyst Weight)×[$(N_{DBT,0}-N_{DBT})/(N_{DBT,0})$]

wherein, $N_{DBT}$ and $N_{DBT,0}$ are dibenzothiophene contents of the product and feed.

HDS activity (4,6DMDBT)=(Liquid Hourly Space Velocity per Unit Catalyst Weight)×[$(N_{4,6DMDBT,0}-N_{4,6DMDBT})/(N_{4,6DMDBT,0})$]

wherein, $N_{4,6DMDBT}$ and $N_{4,6DMDBT,0}$ are 4,6 dimethyldibenzothiophene contents of the product and feed.

HDN activity=(Liquid Hourly Space Velocity per Unit Catalyst Weight)×$(N_N)/(N_{N,0}-N_N)$ wherein, $N_{N,0}$ is quinoline content of the feed and $N_N$ is a total content of propylcyclohexane, propylcyclohexane and propylbenzene in the product.

HDA activity=(Liquid Hourly Space Velocity per Unit Catalyst Weight)×$(N_A)/(N_{A,0}-N_A)$ wherein, $N_{A,0}$ is 1-methylnaphthalene content of the feed and $N_A$ is a total content of 2-methylnaphthalene, methyl tetralin, methyl decalin, alkyl benzene and alkyl toluene in the product.

HI activity=(Total area of peaks at a retention time of 9.40 to 10.14 in the gas chromatogram obtained under the conditions given in Table 4, % on total area of all peaks).

HC activity=(Total area of peaks at a retention time of 4.8 to 5.18 in the gas chromatogram obtained under the conditions given in Table 4, % on total area of all peaks).

The activity assessment results are given in Table 6.

TABLE 3

| Test oil | LGO-D |
|---|---|
| Specific gravity (15/4° C.) | 0.846 |
| Sulfur (wt. %) | 0.92 |
| Nitrogen (wt. ppm) | 91.0 |
| Aromatics (wt. %) | 26.8 |
| Reactor: Fixed-bed, flow type reactor | |
| Reactor inner diameter: | 10 mm |
| Catalyst charged (g): | 4.6 |
| Reactor conditions: | |
| Reactor temperature (°C.) | 320 |
| Reactor pressure (kg/cm²-G) | 9 |
| Liquid hourly space velocity (hr⁻¹) | 0.5 |
| Hydrogen/oil ratio (SCF/B) | 800 |

TABLE 4

| | Test Conditions | | |
|---|---|---|---|
| | 1 | 2 | 3 |
| Test Oil | | | |
| Composition (wt. %) | | | |
| n-$C_{16}$ | 99.20 | 99.13 | 89.20 |
| DBT | 0.50 | 0.50 | 0.50 |
| 4,6-DMDBT | 0.30 | 0.30 | 0.30 |
| Quinoline | — | 0.07 | — |
| 1-Methyl naphthalene | — | — | 10 |
| Reactor temperature (° C.) | 310 | 310 | 310 |
| Liquid hourly space velocity (hr⁻¹) per unit catalyst weight | 1.0 | 1.0 | 1.0 |
| Hydrogen/oil ratio (SCF/B) | 2000 | 2000 | 2000 |

TABLE 5

| Gas chromatograph: | GL Science, GC-353 (FID) |
|---|---|
| Column: | J & W Scientific, DB-1 |
| | Inner diameter: 0.25 mm |
| | Film thickness: 1 m |
| | Length: 60 m |
| Analysis conditions: | Oven temperature: 250° C. |
| | Injection temperature: 250° C. |
| | Detector temperature: 250° C. |

TABLE 6

| | EXAMPLES | | | | | | | COMPARATIVE | | |
|---|---|---|---|---|---|---|---|---|---|---|
| | | | | 4 | 5 | 6 | | EXAMPLES | | |
| | 1 | 2 | 3 | CMPDSAH02 | NMPt | NMZ | 7 | 1 | 2 | 3 |
| Catalysts | NCMSAH19 | NCMSAH23 | NCMSAH19-1 | /20862R1 | /50SAH13R3 | /ZSAH03 | NM | a | b | c |
| Catalyst activity | | | | | | | | | | |
| Hydrodesulfurization activity (HDS) | | | | | | | | | | |
| HDS (LGO-D) | 3.4 | 4.0 | 3.3 | — | — | — | — | 2.3 | 2.2 | — |
| HDS (4,6-DMDBT) | 15.0 | 21.6 | 14.0 | 17.6 | 22.0 | 13.4 | 20.9 | 11.4 | 11.0 | 0 |
| HDS (DBT) | 88 | 89 | 88 | 81 | 54 | 56 | 62 | 48 | 45 | 2.2 |
| Hydrodenitorogenation activity HDN | — | 6.9 | — | — | — | — | 11.2 | 5.8 | 5.0 | 0.3 |

TABLE 6-continued

| | | | | | EXAMPLES | | | | COMPARATIVE EXAMPLES | | |
|---|---|---|---|---|---|---|---|---|---|---|---|
| | | | | 4 | 5 | 6 | | | | | |
| Catalysts | 1 NCMSAH19 | 2 NCMSAH23 | 3 NCMSAH19-1 | CMPDSAH02 /20862R1 | NMPt /50SAH13R3 | NMZ /ZSAH03 | 7 NM | 1 a | 2 b | 3 c |
| Hydrocracking activity HC | 0.03 | 0.04 | 0.03 | 0.04 | 0.11 | — | 0.05 | 0.04 | 0.03 | 0.04 |
| Hydrodearomatization activity HDA | 5.3 | — | 5.2 | 5.0 | — | — | 6.4 | 4.2 | 4.0 | 0.07 |
| Hydrosomerization activity HI | 0.68 | 0.68 | 0.67 | 0.67 | 3.07 | — | 0.36 | 1.17 | 1.00 | 0.01 |

TABLE 7

| EXAMPLES | | Active Component Total Content on the Total Moles (mol/mol) | Homogeneity | | | | Activities | | | | | | |
|---|---|---|---|---|---|---|---|---|---|---|---|---|---|
| | | | | A $N_{max} - N_{min}$ | B $2 \times [3 \times (No)^{0.5} + 0.2 \times No]$ | *A ≤ B | Crystallinity XRD | HDS LGO-D | 4,6-DMDBT | DBT | HDN | HC | HDA | HI |
| 1 | NCMSAH19 | 0.051 | Mo | 326 | 431 | O | Observed | 3.4 | 15.0 | 88 | — | 0.03 | 5.3 | 0.68 |
| | | | Co | 471 | 662 | O | | | | | | | | |
| | | | Ni | 195 | 199 | O | | | | | | | | |
| 2 | NCMSAH23 | 0.069 | Mo | 520 | 552 | O | Observed | 4.0 | 21.6 | 89 | 6.9 | 0.04 | — | 0.68 |
| | | | Co | 854 | 893 | O | | | | | | | | |
| | | | Ni | 203 | 209 | O | | | | | | | | |
| 3 | NCMSAH19-1 | 0.051 | Mo | 358 | 466 | O | Observed | 3.3 | 14.0 | 88 | — | 0.03 | 5.2 | 0.67 |
| | | | Co | 518 | 718 | O | | | | | | | | |
| | | | Ni | 204 | 207 | O | | | | | | | | |
| 4 | CMPDSAH02 | 0.068 | Mo | 545 | 586 | O | Observed | — | 17.6 | 81 | — | 0.04 | 5.0 | 0.67 |
| | | | Co | 850 | 934 | O | | | | | | | | |
| | | | Pd | — | — | O | | | | | | | | |
| 5 | NMPt/2082R1 | 0.027 | Mo | 275 | 289 | O | Observed | — | 22.0 | 54 | — | 0.11 | — | 3.07 |
| | | | Ni | 343 | 374 | O | | | | | | | | |
| | | | Pt | — | — | O | | | | | | | | |
| 6 | NMZ/ 50SAHBR3 | 0.027 | Mo | 236 | 253 | O | Observed | — | 13.4 | 56 | — | — | — | — |
| | | | Ni | 396 | 400 | O | | | | | | | | |
| | | | Zn | 326 | 330 | O | | | | | | | | |
| 7 | NM/ZSAH03 | 0.054 | Mo | 343 | 450 | O | Observed | — | 20.9 | 62 | 11.2 | 0.05 | 6.4 | 0.36 |
| | | | Ni | 512 | 545 | O | | | | | | | | |

*O shows to satisfy the A ≤ B of the relationship (1) while X shows not to satisfy it.

TABLE 8

| COMPARATIVE EXAMPLES | | Active Component Total Content on the Total Moles (mol/mol) | Homogeneity | | | | Activities | | | | | | |
|---|---|---|---|---|---|---|---|---|---|---|---|---|---|
| | | | | A $N_{max} - N_{min}$ | B $2 \times [3 \times (No)^{0.5} + 0.2 \times No]$ | *A ≤ B | Crystallinity XRD | HDS LGO-D | 4,6-DMDBT | DBT | HDN | HC | HDA | HI |
| 1 | a | 0.051 | Mo | 808 | 678 | X | Observed | 2.3 | 11.4 | 48 | 5.8 | 0.04 | 4.2 | 1.17 |
| | | | Co | 587 | 599 | O | | | | | | | | |
| | | | Ni | 221 | 200 | X | | | | | | | | |
| 2 | b | 0.051 | Mo | 633 | 625 | X | Observed | 2.2 | 11.0 | 45 | 5.0 | 0.03 | 4.0 | 1.00 |
| | | | Co | 491 | 553 | O | | | | | | | | |
| | | | Ni | 211 | 192 | X | | | | | | | | |
| 3 | c | 0.007 | Ru | 111 | 114 | O | Not Observed | — | — | 2.2 | 0.3 | 0.04 | 0.07 | 0.01 |

*O shows to satisfy the A ≤ B of the relationship (1) while X shows not to satisfy it.

It is found, based on the results of EXAMPLES and COMPARATIVE EXAMPLES, that the hydrotreating catalyst prepared by any one of EXAMPLES, which has a specific content of hydrogenation-active component(s), satisfies the relationship (1) representing homogeneity and contains a crystalline component, shows more notable effects in, e.g., desulfurization activity, than those prepared by COMPARATIVE EXAMPLES. It is particularly noted that satisfying the relationship (1) significantly contributes to improved desulfurization activity, as shown in Table 7. It is also noted that the hydrotreating catalyst of the present invention, satisfying the relationship (1), shows especially high activities for desulfurization (e.g., of 4,6-DMDBT) and isomerization, when incorporated with selected active component(s), e.g., the catalyst prepared by EXAMPLE 5.

What is claimed is:

1. A hydrotreating catalyst comprising a refractory inorganic oxide matrix dispersed with a hydrogenation-active component,
said hydrogenation-active component comprising at least one active component (A) selected from the Group 6A elements, and/or at least one active component (B) selected from the Group 8 elements, wherein
   (1) total content of said hydrogenation-active component is 0.02 moles to 0.4 moles per mole of all of the elements that constitute the catalyst,
   (2) of said hydrogenation-active component, any one, when present at 0.002 mol/mol or more, satisfies the following relationship (1), established by the EPMA line analysis:

$$N_{max} - N_{min} \leq 2 \times [3 \times (N_0)^{0.5} + 0.2 \times N_0] \quad (1)$$

wherein $N_{max}$, $N_{min}$ and $N_0$ are the maximum, minimum and average contents of the hydrogenation-active component, determined by the EPMA line analysis,
   or following relationship (2), established by the EPMA plane analysis:

$$0.8 \leq S \text{ parameter} < 1, \ 0.8 \leq P \text{ parameter} < 1 \quad (2)$$

wherein S parameter and P parameter are an index for size uniformity and distribution of the active component particles, respectively, determined by the EPMA plane analysis, and
   (3) one or more diffraction lines relevant to crystalline component are observed by powder X-ray diffraction analysis.

2. The hydrotreating catalyst according to claim 1, wherein said refractory inorganic oxide matrix comprises at least one oxide selected from the group consisting of alumina, silica, magnesia, calcium oxide, boria, zirconia, titania, thoria, ceria, hafnia, phosphorus oxide, alumina-silica, alumina-magnesia, alumina-boria, alumina-zirconia, alumina-thoria, alumina-titania-zirconia, silica-magnesia, silica-zirconia, silica-boria, silica-thoria, silica-titania, alumina-silica-zirconia, alumina-silica-boria, alumina-silica-magnesia, alumina-silica-halfnia, alumina-silica-phosphorus oxide and alumina-silica-boria-phosphorus oxide.

3. The hydrotreating catalyst according to claim 2, wherein said refractory inorganic oxide matrix comprises at least one oxide selected from the group consisting of alumina, silica, magnesia, alumina-silica, alumina-magnesia, alumina-boria, alumina-titania, alumina-phosphorus oxide, alumina-silica-magnesia, alumina-silica-boria, alumina-silica-phosphorus oxide and alumina-silica-boria-phosphorus oxide.

4. The hydrotreating catalyst according to claim 3, wherein said refractory inorganic oxide matrix comprises an oxide selected from the group consisting of alumina-silica, alumina-silica-phosphorus oxide and alumina-silica-zirconia.

5. The hydrotreating catalyst according to claim 1, wherein said hydrogenation-active component (A) comprises molybdenum and/or tungsten.

6. The hydrotreating catalyst according to claim 5, wherein said hydrogenation-active component (A) comprises molybdenum.

7. The hydrotreating catalyst according to claim 1, wherein said hydrogenation-active component (B) comprises at least one metal component selected from the group consisting of cobalt, nickel, palladium and platinum.

8. The hydrotreating catalyst according to claim 7, wherein said hydrogenation-active component (B) comprises cobalt and/or nickel.

9. The hydrotreating catalyst according to claim 1, wherein said hydrogenation-active component comprises a composite component selected from the group consisting of molybdenum-cobalt, molybdenum-nickel and molybdenum-cobalt-nickel.

10. The hydrotreating catalyst according to any one of claims 1, 5 or 8, wherein said hydrogenation-active component comprising said active component (A) and/or (B) is further incorporated with a third active component (C) comprising at least one element selected from the group the group consisting of Group 1B, 2B and 7A elements.

11. The hydrotreating catalyst according to claim 10, wherein said active component (C) is selected from the group consisting of copper, zinc, manganese and rhenium.

* * * * *